United States Patent [19]

Windemuller

[11] Patent Number: 5,074,107
[45] Date of Patent: Dec. 24, 1991

[54] BLUEBERRY HARVESTING MACHINE

[76] Inventor: Donald Windemuller, 15410 Greenly St., Holland, Mich. 49424

[21] Appl. No.: 605,580

[22] Filed: Oct. 30, 1990

[51] Int. Cl.⁵ ............................................. A01D 46/00
[52] U.S. Cl. ..................................... 56/330; 56/12.8; 56/DIG. 8
[58] Field of Search ...................... 56/330, 12.8, 14.3, 56/328.1, 340.1, 329, DIG. 2, DIG. 8

[56] References Cited

U.S. PATENT DOCUMENTS

| | | | |
|---|---|---|---|
| 2,660,021 | 11/1953 | McDowell | 56/330 |
| 3,255,578 | 6/1966 | Pertics | 56/330 |
| 3,590,566 | 7/1971 | Cutts, Sr. | 56/330 |
| 3,601,964 | 8/1971 | Fisher | 56/330 |
| 3,720,050 | 3/1973 | Rozinska | 56/330 |
| 3,827,222 | 8/1974 | Toti | 56/330 |
| 3,872,655 | 3/1975 | Davis, Sr. | 56/27.5 |
| 4,150,526 | 4/1979 | Burton | 56/329 |
| 4,186,547 | 2/1980 | James | 56/330 |
| 4,303,373 | 12/1981 | Polhemus | 415/206 |
| 4,430,849 | 2/1984 | Wilson et al. | 56/12.8 |

FOREIGN PATENT DOCUMENTS

| | | |
|---|---|---|
| 2421546 | 4/1978 | France . |
| 2452239 | 3/1979 | France . |
| 1227229 | 4/1986 | U.S.S.R. . |

Primary Examiner—Terry Lee Melius
Attorney, Agent, or Firm—Price, Heneveld, Cooper, DeWitt & Litton

[57] ABSTRACT

A harvesting machine having a self-propelled substantially U-shaped frame which can straddle a row of blueberry bushes. A collection surface is provided within the machine made up of a plurality of pivotally mounted overlapping catcher pans which extend inwardly toward the center of the machine from each side. A blueberry bush when in the machine forms an opening in the catcher pans about the upwardly and outwardly extending branches of the bush. A large volume of air is directed from each side of the harvesting machine under the catcher pans forming the collection surface and upwardly through the opening in the collection surface into the blueberry bush. The fountain of air into the blueberry bush diverts to the sides of the machine for harvesting those berries that might have fallen through the opening in the collection surface to the ground.

16 Claims, 3 Drawing Sheets

5,074,107

BLUEBERRY HAVESTING MACHINE

BACKGROUND OF THE INVENTION

The present invention relates to an improved harvesting machine which substantially increases the amount of crop gathered in the harvesting process. The term "blueberry" is used as a generic expression for all types of fruits, nuts, vegetables, and the like, which grow on bushes, trees and vines and which can be harvested mechanically by a machine passing over the crop bearing plant.

In the conventional blueberry harvesting machine, a frame is supported on ground contacting wheels which are driven by a motor so that the entire assembly is self-propelled. The frame for the harvesting machine is usually of an inverted "U" type having box-like sides extending substantially the full length of the machine. Within the U-shaped portion of the machine, and extending from each inwardly facing vertical side, are a plurality of movable arms which contact the bush bearing the blueberries to be harvested causing the blueberries to be dislodged from the branches of the bush without damaging the branches. The blueberries then drop onto a collection surface formed by a plurality of pivotally mounted overlapping catcher pans which extend inwardly from each side of the inverted U-shaped frame toward the longitudinal center line of the frame. The catcher pans are horizontally inclined so that any fruit which falls onto the pans will be directed toward the sides of the harvesting machine.

As the harvesting machine advances over a row of bushes, the bushes cause the pivotally mounted and spring biased catcher pans to be deflected backward forming an opening in the collector pans about the upwardly extending branches of the bush. The catcher pans form a substantially continuous collecting surface under the extending fruit bearing branches. The blueberries dislodged by the arms drop onto the catcher pans and slide or roll to the sides of the harvesting machine where they are gathered on endless conveyor belts. The blueberries are then carried to the rear of the machine into collecting containers. As can be seen from the description above, the machine is quite efficient gathering approximately seventy-five percent of the harvestable fruit growing on each bush being harvested. The remaining twenty-five percent of the fruit, however, is usually lost by falling directly downward through the bush onto the ground through the opening in the catcher pans. A mature blueberry bush can have a base as large as 18-20 inches in diameter which is formed by a plurality of branches which extend upwardly and outwardly from the ground. The catcher pans contact the bush near the bottom of the outwardly extending branches and leave a substantial opening in the center of the bush where blueberries can drop directly to the ground and be lost.

SUMMARY OF THE INVENTION

In accordance with the present invention, an improved blueberry harvesting machine is provided which can recover substantially the entire harvestable crop. In the improved harvesting machine, a source of a large volume of air is provided on each side of the frame of the harvesting machine below the catcher pans. The air is directed from each side of the machine toward the center and upwardly so that it passes through the opening in the catcher pans caused by the upwardly extending branches of the bush being harvested. The air passing upwardly into the blueberry bush causes those blueberries which in the past would have fallen directly onto the ground to now be deflected away from the center of the bush to the area surrounding the bush where they then drop onto the catcher pans for harvesting. The asymmetric shape of the blueberry tends to cause the berry to fly away from the source of air rather than maintaining stable flight or suspension in the stream of air.

DETAILED DESCRIPTION OF THE PREFERRED EMBODIMENTS

Figure 1:
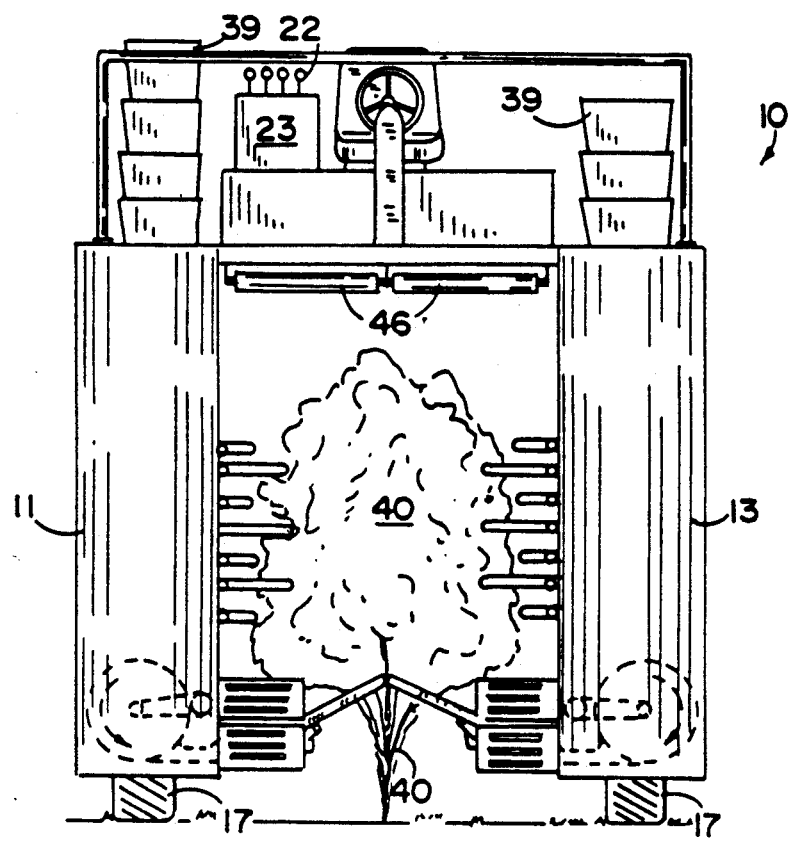
FIG. 1 is a front elevational view, partially in phantom, of the harvesting machine.
Figure 2:
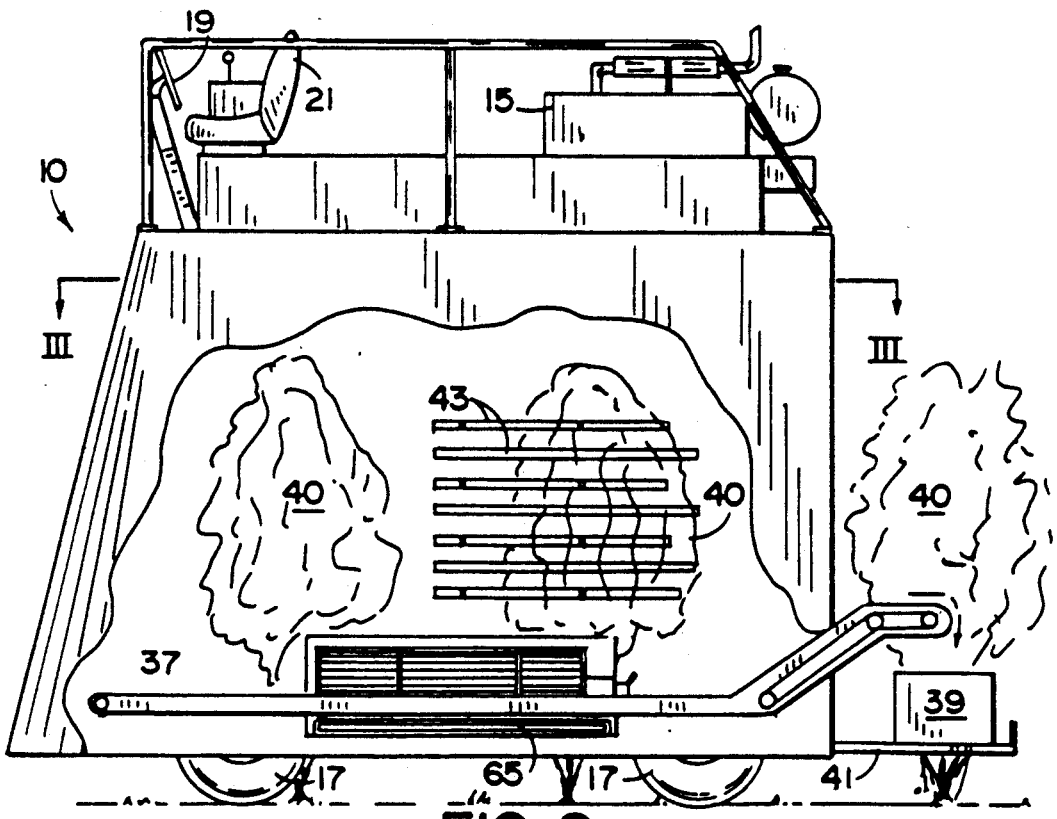
FIG. 2 is a side elevational view of the harvesting machine partially broken away to show components within the machine.
Figure 3:
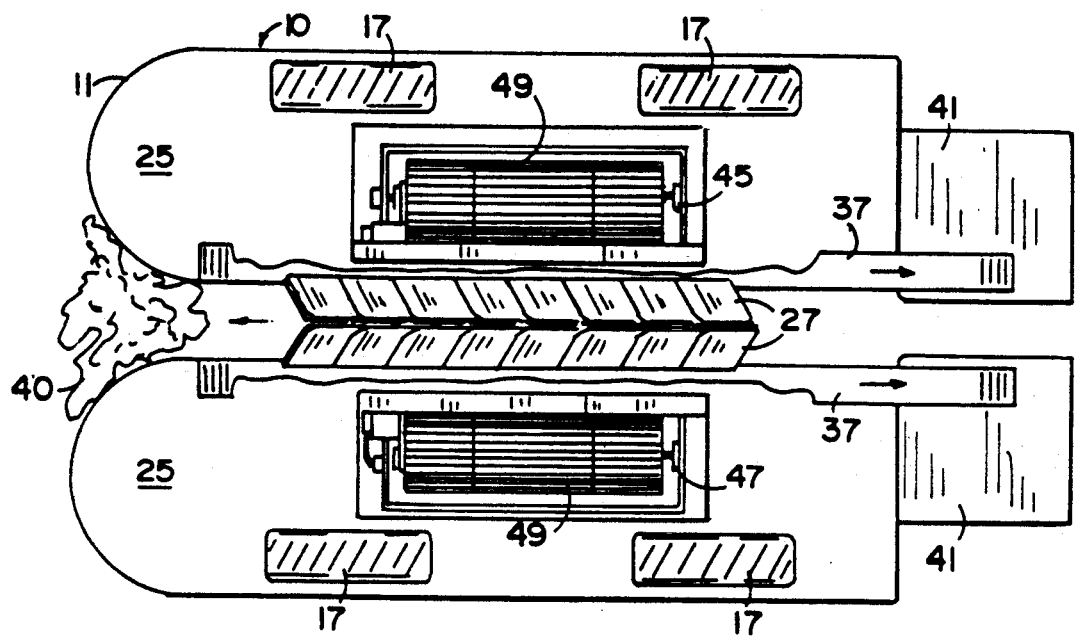
FIG. 3 is a sectional plan view taken along the line and in the direction indicated by the line III—III in FIG. 2.

Referring to FIGS. 1 and 2, the harvesting machine of the present invention is shown and indicated generally by the number 10. The outward appearance of the harvesting machine and some of the inner mechanical harvesting machines sold by Blueberry Equipment, Inc. of South Haven, Michigan. The harvesting machine has an inverted U-shaped configuration having a left side 11 and a right side 13, as shown in FIG. 1. The harvesting machine is a self-propelled motor vehicle having an engine 15 (FIG. 2), four ground contacting wheels 17, a steering wheel 19, a seat 21 and a plurality of hand controls 22 located on a console 23. The outer surface of the machine is covered with a smooth material, preferably sheet metal, to enable the machine to pass over a row of bushes being harvested while slipping smoothly along the adjacent rows of bushes without damaging them. As shown in FIG. 3, the leading edge portion 25 of each side of the machine is rounded to protect adjacent bushes and also to help direct the outwardly extending branches of the bushes being harvested into the center portion of the machine without damage to the bushes or to the berries thereon.

Figure 5:
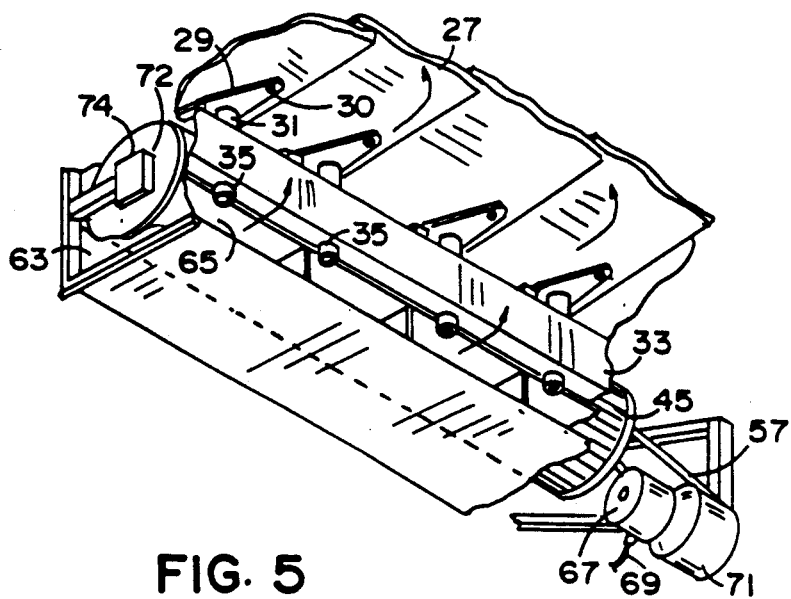
FIG. 5 is a fragmentary view showing an air source and the air deflected upward toward the bottom of the catcher pans.

As shown in FIGS. 1 and 3, the bottom portion of the center of the harvesting machine is substantially closed by a plurality of overlapping pivotally mounted catcher pans 27. Referring to FIG. 5, each catcher pan 27 is fastened to a plate 29 by a fastener 30. A shaft (not shown) extends from plate 29 into sleeve 31, which is fastened to the frame 33 of the harvesting machine by a fastener 35. A coil spring (not shown) surrounds the shaft fastened to plate 29 and causes the catcher pan 27 to be biased so that it tends to project outwardly toward the longitudinal center line of the harvesting machine. The plates 29 support each catcher pan 27 at a horizontally inclined angle (FIG. 1) so that fruit falling onto the catcher pans will flow away from the center of the machine down the surface of the pan onto the continuous conveyor belts 37 which carry the fruit to the rear of the machine where it is dropped (FIG. 2) into containers 39 supported on the shelf 41 which project from each side of the rear of the harvesting machine. In FIG. 1, a plurality of containers 39 can be seen stock piled on the top surface of the harvesting machine on either side of the position from which the machine is controlled.

In the operation of the harvesting machine, the machine is driven along a row of blueberry bushes 40 straddling the row of bushes. AS the machine passes over a bush, the bush causes the spring biased catcher pans 27 to be pushed backward opening a path for the bush. As the machine continues to advance, those catcher pans no longer in contact with the base of the bush are caused to be returned to the center position by the bias springs. The machine continues to advance with the bush pushing back only those catcher pans which are in contact with the upwardly and outwardly extend branches of thebush. The pans not in contact with the bush, and those in contact with the bush which are only partially deflected, combine to form a surface beneath the fruit bearing branches of the bush upon which fruit can drop for harvesting.

The harvesting machine 10 continues to advance along the row of bushes and when a bush reaches the arms 43 within the machine, the arms gently agitate the bush causing the ripe blueberries to fall from the bush onto the catcher pans 27 from which they are directed onto the conveyor belts 37 on each side of the machine. When an occasional blueberry bush is encountered, a pair of eccentrically mounted rollers 46 gently shake the top of the bush causing berries on the upper branches to fall for collection and harvesting.

In the normal operation of the harvesting machine, the machine moves at a slow steady pace along the row of bushes being harvested with each bush in turn being taken into the machine for removal of the ripe blueberries. As each blueberry bush pushes back the catcher pans 27, an opening is provided in the surface formed by the overlapping catcher pans which opening varies in size, depending on the diameter of each blueberry bush. Depending on the maturity of the blueberry bushes, the portion of the bush near the ground can vary from a few inches up to approximately twenty inches in diameter. The opening in the catcher pans varies similarly with the largest and most productive bushes forming the largest opening in the catcher pans through which fruit can fall directly onto the ground. As mentioned previously, approximately twenty-five percent of each crop of blueberries is lost in this manner.

In order to recover this large portion of the crop which is lost each season, an improved harvesting machine has been developed. The improved harvesting machine employs many of the components of the already described harvesting machine. In the new machine, however, a source of a large volume of air is provided on each side of the machine. Referring to FIG. 3, the harvesting machine 10 has a blower 45 mounted in side 11, and a flower 47 mounted inside 13. Each of the blowers is preferably of the cross-throw type which can move a substantial volume of air at a very low pressure. The blowers 45 and 47 are each approximately four feet in length and sixteen inches in diameter and have a plurality of spaced, slightly concave, air moving vanes 49 for moving the air. In contrast to a centrifugal fan which takes the air in from the center and expels it from the side, a cross-throw fan takes the air in from the side and pushes the air into a closely positioned duct from which it is exhausted for use. The cross-throw fans used in the improved blueberry harvesting machine are similar to the type used in wheat harvesting combines and can each deliver approximately 8,000 cubic feet of air per minute at a pressure of only approximately one and one-half inches of water. While the cross-throw fan is preferred, the invention is not so limited. Other types of fans such as centrifugal and separate blades mounted on a hub can be used. Also, the fans can either push or pull the air.

Figure 4:
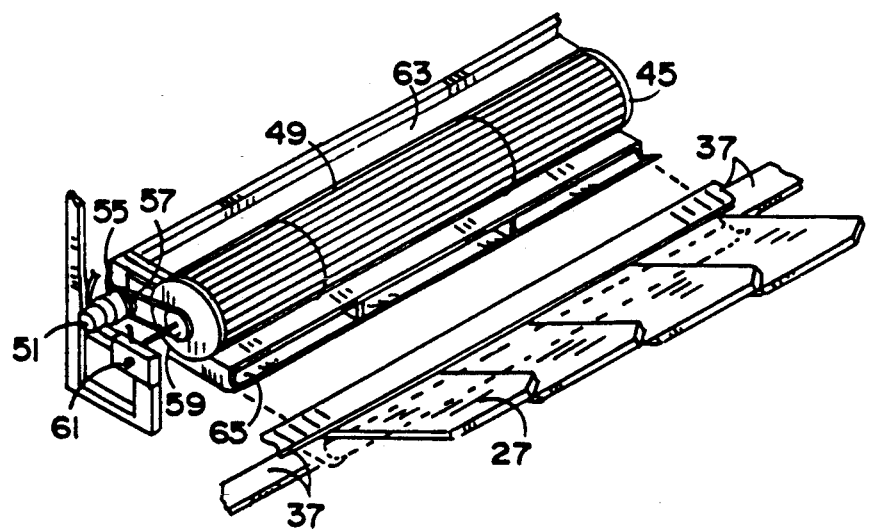
FIG. 4 is an exploded view showing an air source and exhaust duct set back from a plurality of catcher pans.

In FIG. 4, fan 45 is shown mounted on a portion of the frame 50 of the harvesting machine. The fan is indirectly driven by a motor 51 and a reduction gear 53 which drives a pulley 55 which supports a belt 57 which is connected to a driven pulley 59 attached to the center shaft 61 of the blower 45. The motor 51 is preferably of the hydraulic type sign connected to the hydraulic system available on the blueberry harvesting machine through the pressure lines 62. Each of the motors is a 1.24 cubic inch piston-type which can develop 20-30 hp. The horsepower delivered by the motor is determined by the amount and pressure of the hydraulic fluid passing through the motor. Other types of hydraulic motors can be used, as well as electric motors, to drive the fan, for example, each fan can be equipped with a properly sized electric motor operating off of the electrical system and storage battery of the harvesting machine.

As mentioned previously, the cross-throw fan 45 takes air into the side of the fan and then pushes the air directly into the duct system 63 (FIG. 4) which directs the air through a duct system to an exhaust outlet 64 which diverts the air upwardly so that it strikes the bottom of each catcher pan 27. The substantial volume of air moving under the overlapping catcher pans causes the pans to vibrate assisting in the movement of the blueberries down the pan onto the conveyor belts 37.

In FIG. 5, an electric motor 67 is shown mounted on frame 50 of the harvesting machine. The motor 67 receives power from the electrical system of the harvesting machine through the conductor 69. The motor 67 drives a gear reducing assembly 71 which, in turn, drives the fan 45 with a suitable drive belt 57. The supporting shafts at each end of the blowers 45 and 47 are supported in suitable bearing blocks 72 in order to reduce the friction on each shaft. The baring blocks can be equipped with grease zerks 74 to facilitate lubrication of each end of the supporting shaft.

Figure 6:
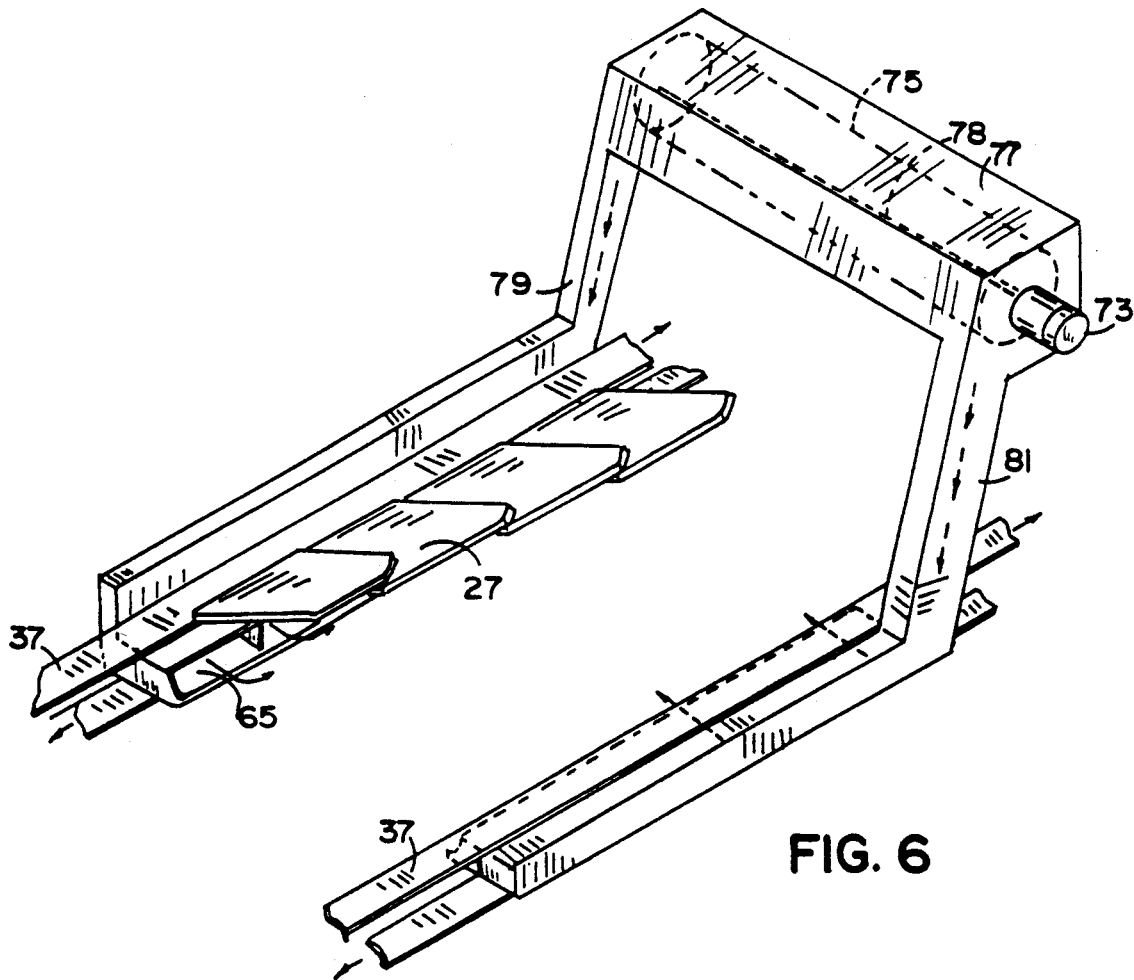
FIG. 6 shows a single air source connected to a duct system for leading air out on each side of the harvesting machine.

While indirectly driven blowers are shown in several views, it is preferred to use direct drive for the blower as shown in FIG. 6 where the motor 73 is directly attached to the center shaft 78 of the fan 75, shown in phantom. By using direct drive for each blower on the harvesting machine, several sources of potential mechanical failure are eliminated increasing the reliability of the blower assemblies.

The outlets 65 (FIGS. 4 and 5) for each blower assembly 45 and 47 are directed toward the center of the harvesting machine and upwardly toward the longitudinal center line of the machine where the overlapping catcher pans 27 on each side of the machine approach and randomly contact each other. With each cross-throw fan 45 and 47 delivering approximately 8,000 cubic feet per minute of air into the center of the machine, a large volume of air is applied to the bottoms of the catcher pans 27. As the harvesting machine advances and a bush moves into the catcher pans, the openings in the catcher pans caused by the bush allow the large volume of air to blow directly through the catcher pans and up into the blueberry bush. The large fountain-like stream of air entering upwardly into the bush causes substantially all of the blueberries in the center of the bush to be deflected away from the bush toward the catcher pans on each side rather than a falling directly through the bush onto the ground. As previously mentioned, the asymmetric shape of the blueberry cause it to move in the air stream rather than to be merely suspended.

As shown in FIGS. 2 and 3, the output of the blueberries causes the stream of air to contact the entire bottom surface of all of the overlapping catcher pans and particularly in the area below that portion of the machine where the arms 43 and rollers 46 are in contact with the bush gently dislodging the berries.

While the preferred embodiment of the harvesting machine of the present invention uses a separate blower on each side of the machine, it is within the scope of the present invention to provide a single blower 75 (FIG. 6) mounted above the area of the harvesting machine through which the bushes pass which forces air into a plenum chamber 77 which is connected to air ducts 79 and 81 on each side of the machine, which direct the air downwardly, as indicated by the arrows, and along the catcher pans 27 where it again is exhausted along substantially the entire length of the catcher pans toward the center of the harvesting machine and upwardly against the bottoms of the catcher pans.

In the operation of the machine, the air is blown into the center of the machine from air supply ducts mounted on each side of the machine. In FIG. 2, the air duct 65 can be seen directing air below the conveyor belt 37. While this construction or positioning of the air ducts has been found to work very well, the projection from the bottom of the machine can cause ground clearance problems, particularly with the earth which is normally raised covering the roots of each bush. In the preferred embodiment, FIG. 4 and most clearly seen in FIG. 6, the air duct is positioned within the area bounded by the conveyor belts 37. This enables the air to be supplied immediately below the catcher pans 27 without having air ducts projecting below the machine. By positioning the air ducts within the conveyor belt, the ground clearance problem is substantially eliminated.

The usual conveyor belt used on each side of the harvesting machine is segmented or compartmentalized steel or aluminum assembly having a plurality of interconnected flat segments, each of which has a projection extending approximately 1 to 2 inches above the fruit carrying portion of the belt. This construction of the belt causes the conveyor system to have substantial thickness in view of the wheels required at each end to smoothly turn the interconnected metal segments and the projecting compartment partitions on the belt. In order to improve the conveyor belt, and to substantially reduce its thickness, is preferred to use a flexible belt having ribs for partitioning members. While any flexible polymeric material can be used, preferably reinforced polymeric material, it has been found that a nylon belt can be used along with partitioning ribs attached to the surface of the belt or formed as part of the belt. Since individual metal segments would no longer be used, the turn around rollers at each end of the conveyor belt can be made much smaller in view of the flexibility of the belt and, in turn, the spacing between the top and bottom portions of the conveyor belt can be substantially reduced. Converting to a flexible polymeric or rubber-like belt also eliminates a potential source of trouble in the machine, again further improving the reliability of the machine.

Through the use of the improved harvesting machine of the present invention, it has been found that a row of blueberry bushes can be harvested at the same speed as in the past with substantially all of the harvestable crop being harvested.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows:

1. A blueberry harvesting machine comprising:
   first means for causing blueberries to fall from a fruit bearing plant;
   second means for releasably enclosing the lower portion of the fruit bearing plant, below the portion of the plant supporting the blueberries, for catching the blueberries falling from the plant; and
   third means for blowing air upwardly through said second means into the fruit bearing plant to divert any fruit that might fall through said second means to harvest said fruit.

2. A blueberry harvesting machine as set forth in claim 1, wherein said first means comprises an apparatus for agitating the plant cause blueberries to come loose from the plant.

3. A blueberry harvesting machine as et forth in claim 1, wherein said second mean comprises a plurality of spring biased catcher pans which can be moved by the plant to form an opening in said catcher pans with said catcher pans forming a surface below the extending fruit falling from the plant.

4. A blueberry harvesting machine as set forth in claim 3, wherein said third means is at least one source of a large volume of air directed upwardly toward said second means.

5. A blueberry harvesting machine as set forth in claim 4, wherein said third means is a pair of fans for forcing a large volume of air upwardly toward said catcher pans and through the opening in said catcher pans into the plant for diverting fruit to said catcher pans that might otherwise fall through the opening in said catcher pans onto the ground.

6. A blueberry harvesting machine comprising:
   a substantially U-shaped frame having spaced ground contacting wheels for supporting and moving said frame enabling the machine to straddle a blueberry bush;
   a plurality of horizontally inclined catcher pans pivotally mounted near the bottom of each side of said frame, said pans on each side overlapping and a being spring biased to extend inwardly toward the pans on the opposite side of said frame forming a substantially continuous inclined collected surface sloping outwardly toward each side of said frame;
   a continuous conveyor belt on each side of said frame extending from the front to the rear of said frame and positioned below the lower edge of said catcher pans for conveying to the rear of said frame berries that fall on said inclined catcher pans;

an air blower mounted on each side of said frame;

a duct for each blower for channeling the air into opposed streams which converge under said catcher pans to form a fountain of air which passes upwardly through the opening in the catcher pans formed by a blueberry bush and into the blueberry bush to divert to either side of the machine berries that would have otherwise fallen through the opening in the catcher pans onto the ground.

7. A blueberry harvesting machine as set forth in claim 6, wherein said air blower is a fan.

8. A blueberry harvesting machine as set forth in claim 6, wherein said air blower s a cross-throw fan.

9. A blueberry harvesting machine as set forth in claim 7, wherein said fan is indirectly driven by a motor and a continuous belt.

10. A blueberry harvesting machine as set forth in claim 7, wherein said fan is directly driven by a motor attached to said fan.

11. A blueberry harvesting machine as set forth in claim 6, wherein said conveyor belt is made of a polymeric material and has transverse ribs for dividing the belt into compartments.

12. A blueberry harvesting machine as set forth in claim 11, wherein said conveyor belt comprises a nylon belt.

13. A blueberry harvesting machine as set forth in claim 6, wherein said fountain of air causes said catcher pans to vibrate assisting in transferring blueberries from said catcher pans to said conveyor belts.

14. A blueberry harvesting machine comprising:

a self-propelled substantially U-shaped frame having space ground contacting wheels for supporting and moving said frame enabling the machine to straddle a blueberry bush;

a plurality of horizontally inclined catcher pans pivotally mounted on each side of the interior of said frame, said catcher pans being spring biased to project toward the longitudinal center line of said U-shaped frame and being able to be deflected by a blueberry bush to form a moving opening between said catcher pans as the machine moves over a blueberry bush;

at least one large volume source of air supported on said frame;

a pair of air passages for directing said large volume of air from said at least one source beneath said catcher pans causing said air to converge and to flow in a fountain-like manner upward into said blueberry bush, through the opening in said catcher pans around said blueberry bush, where said air causes berries which might have fallen through the opening in the catcher pans to be directed toward either side of the machine for harvesting.

15. A blueberry harvesting machine comprising:

a self-propelled substantially U-shaped frame having spaced ground contacting wheels for supporting and moving said frame enabling the machine to straddle a blueberry bush;

a plurality of horizontally inclined catcher pans pivotally mounted on each said of he interior of said frame, said catcher pans being spring biased to project toward the longitudinal center line of said U-shaped frame and being able to be deflected as the machine moves over a blueberry bush, said catcher pans forming a surface for gathering blueberries falling from the bush;

a source of a large volume of air mounted on each side of said frame;

an air duct for directing said air from each source to exit below the catcher pans on each side of said frame to form a converging upwardly directed stream of said which passes through the opening in said catcher pans into a blueberry bush deflecting the blueberries to said catcher pans that would otherwise have fallen through the opening onto the ground.

16. An improved method for harvesting blueberries comprising the following steps:

providing a substantially continuous collection surface underneath the extending branches of a fruit bearing blueberry bush, said surface having an opening therein for said blueberry bush;

providing a large volume of air upwardly through the opening in said collection surface into said blueberry bush to divert substantially all of the blueberries that would have fallen through said opening to said collection surface for harvesting.

* * * * *

UNITED STATES PATENT AND TRADEMARK OFFICE
CERTIFICATE OF CORRECTION

PATENT NO. : 5,074,107
DATED : December 24, 1991
INVENTOR(S) : Donald Windemuller It is certified that error appears in the above-identified patent and that said Letters Patent is hereby corrected as shown below:

Column 2, line 36:
after "mechanical" insert --elements are similar to those provided on blueberry--;

Column 3, line 11:
"AS" should be --As--;

Column 3, line 20:
"extend" should be --extending-- and "thebush" should be --the bush--;

Column 3, line 31:
after "occasional" insert --tall--;

Column 3, line 60:
"flower" should be --blower--;

Column 4, line 18:
delete "sign" and insert therefor --being--;

Column 4, line 33:
"outlet 64" should be --outlet 65--;

Column 4, line 48:
"baring" should be --bearing--;

Column 5, line 8:
after "than" delete --a--;

Column 5, line 13:
"shown" should be --seen--;

Column 5, lines 13 and 14:
"blueberries" should be --blowers--;

Column 5, line 50:
after "is" insert --a--;

Column 6, line 35:
after "plant" insert --to--;

UNITED STATES PATENT AND TRADEMARK OFFICE
CERTIFICATE OF CORRECTION

PATENT NO. : 5,074,107

DATED : December 24, 1991

INVENTOR(S) : Donald Windemuller

It is certified that error appears in the above-identified patent and that said Letters Patent is hereby corrected as shown below:

Column 6, line 37:
"et forth" should be --set forth--;

Column 6, line 38:
"mean" should be --means--;

Column 6, line 42:
After "fruit" insert --bearing branches of the plant for catching fruit--;

Column 6, line 60:
"bottom of" should be --bottom on--;

Column 5, line 15:
"blower s" should be --blower is--;

Column 7, line 36:
"space" should be --spaced--;

Column 8, line 19:
"of he" should be --of the--;

Column 8, line 31:
"said" should be --air--.

Signed and Sealed this

Fifth Day of October, 1993

Attest:

BRUCE LEHMAN

Attesting Officer

Commissioner of Patents and Trademarks